United States Patent
Moss et al.

(10) Patent No.: US 11,313,943 B2
(45) Date of Patent: Apr. 26, 2022

(54) VEHICLE RADAR SYSTEM ARRANGED FOR REDUCING INTERFERENCE

(71) Applicant: VEONEER SWEDEN AB, Vargarda (SE)

(72) Inventors: Jonathan Moss, Haimhausen (DE); Andreas LeFevre, Euerdorf (DE)

(73) Assignee: VEONEER SWEDEN AB, Vargarda (SE)

( * ) Notice: Subject to any disclaimer, the term of this patent is extended or adjusted under 35 U.S.C. 154(b) by 599 days.

(21) Appl. No.: 15/778,504

(22) PCT Filed: Nov. 21, 2016

(86) PCT No.: PCT/EP2016/078346
§ 371 (c)(1),
(2) Date: May 23, 2018

(87) PCT Pub. No.: WO2017/089314
PCT Pub. Date: Jun. 1, 2017

(65) Prior Publication Data
US 2018/0356495 A1 Dec. 13, 2018

(30) Foreign Application Priority Data
Nov. 24, 2015 (EP) .................................... 15196032

(51) Int. Cl.
*G01S 7/02* (2006.01)
*G01S 7/35* (2006.01)
(Continued)

(52) U.S. Cl.
CPC .............. *G01S 7/023* (2013.01); *G01S 7/021* (2013.01); *G01S 7/354* (2013.01); *G01S 13/343* (2013.01);
(Continued)

(58) Field of Classification Search
None
See application file for complete search history.

(56) References Cited

U.S. PATENT DOCUMENTS

| 6,094,160 A | 7/2000 | Lajiness |
| 6,191,726 B1 | 2/2001 | Tullsson |

(Continued)

FOREIGN PATENT DOCUMENTS

| CN | 101271159 A | 9/2008 |
| CN | 102353943 A | 2/2012 |

(Continued)

OTHER PUBLICATIONS

International Search Report and Written Opinion of PCT/EP2016/078346 dated Feb. 22, 2017.
(Continued)

*Primary Examiner* — Whitney Moore
(74) *Attorney, Agent, or Firm* — Dickinson Wright PLLC (57) ABSTRACT

A vehicle radar system (3) having at least one transceiver arrangement (7) arranged to generate, transmit and receive reflected radar signals. The transceiver arrangement (7) includes an ADC arrangement (10) that is arranged to output a digital IF signal (20) in a time domain to a DSP arrangement (12). A first DSP function (12a) is arranged to: identify and retain sample points of the digital IF signal (20) in a spectral domain with signal components that exceed a certain level threshold, such that an approximation signal (36) is formed in the time domain, identify possible sections (37) of the digital IF signal (20) in the time domain that exhibit interference exceeding an interference threshold, determine whether or not to replace such sections (37) with equivalent sections (38) of the approximation signal (36), and if applicable, replace such sections (37) with equivalent sections (38) of the approximation signal (36).

11 Claims, 5 Drawing Sheets

(51) Int. Cl.
    *G01S 13/34*      (2006.01)
    *G01S 13/58*      (2006.01)
    *G01S 13/931*     (2020.01)

(52) U.S. Cl.
    CPC .......... *G01S 13/584* (2013.01); *G01S 13/931*
        (2013.01); *G01S 7/356* (2021.05); *G01S*
        *2013/93271* (2020.01)

(56) References Cited

U.S. PATENT DOCUMENTS

| | | |
|---|---|---|
| 7,907,083 B2 | 3/2011 | Sakamoto et al. |
| 9,739,879 B2 | 8/2017 | Rohling |
| 2010/0073216 A1 | 3/2010 | Sakamoto et al. |
| 2013/0235909 A1* | 9/2013 | Opitz ................. H04B 1/70751 |
| | | 375/148 |
| 2015/0084806 A1 | 3/2015 | Rohling |
| 2015/0260828 A1 | 9/2015 | Ossowska |
| 2016/0018511 A1* | 1/2016 | Nayyar .................. G01S 7/352 |
| | | 342/27 |

FOREIGN PATENT DOCUMENTS

| | | |
|---|---|---|
| EP | 1 672 379 A2 | 6/2006 |
| JP | 2010-071958 A | 4/2010 |
| JP | 2014-153206 A | 8/2014 |
| JP | 2015-517104 A | 6/2015 |
| WO | WO 1998/033073 A1 | 7/1998 |

OTHER PUBLICATIONS

First Office Action in Chinese Application No. 201680068480.2, dated Jun. 3, 2021.

\* cited by examiner

VEHICLE RADAR SYSTEM ARRANGED FOR REDUCING INTERFERENCE

CROSS-REFERENCE TO RELATED APPLICATIONS

This application is a 35 U.S.C. § 371 national phase application of PCT International Application No. PCT/EP2016/078346, filed Nov. 21, 2016, which claims the benefit of priority under 35 U.S.C. § 119 to European Patent Application No. 15196032.5, filed Nov. 24, 2015, the contents of which are incorporated herein by reference in their entirety.

FIELD OF THE INVENTION

The present disclosure relates to a vehicle radar system having at least one transceiver arrangement arranged to generate and transmit radar signals, and to receive reflected radar signals. The transceiver arrangement includes an ADC (Analog to Digital Converter) arrangement that is arranged to output a digital IF (Intermediate Frequency) signal in a time domain to a DSP (Digital Signal Processor) arrangement.

BACKGROUND

Many vehicle radar systems include radar transceivers that are arranged for generating radar signals that are transmitted, reflected and received by use of appropriate antennas of the radar system. The radar signals may for example be in the form of FMCW (Frequency Modulated Continuous Wave) signals where frequency chirps signals are formed in a well-known manner.

In a multi-radar environment, other radars can create interference with each other when the frequency chirps cross, or come close to each other. This exhibits itself as a burst of interference somewhere within the received signal during one or more of the chirp signals. This problem becomes apparent when the received analog signal has been converted to a digital signal and typically is processed by the radar system using one or more FFT (Fast Fourier Transform) processing steps which converts the digital time domain into a frequency domain.

If the interference is present in one or more of the chirp signals, the noise floor will be raised since the noise is spread across all frequencies. This raising of the noise floor has the effect of reducing the range of the radar, which of course is undesirable.

EP 1 672 379 (A2) describes identifying a block of digital samples that has elevated noise levels, and deleting that block. However, this has a negative effect of also raising the noise floor by the creation of sidelobes following the FFT processing.

U.S. Pat. No. 6,191,726 (B1) describes removing interference after converting the digital signals to the frequency domain and filtering using an FIR (Finite Impulse Response) filter. However, this approach also has the effect of damaging the desired signal.

US 2015/0260828 (A1) describes using interpolation for removing interference. However, a more accurate result is desired.

It is therefore desired to provide a vehicle radar system that is able to provide removal of interference that provides more accurate results than described previously.

The object of the present disclosure is thus to provide a vehicle radar system that is able to provide removal of interference that provides more accurate results than described previously.

SUMMARY

The above-mentioned object is achieved by embodiments of the present invention in the form of a vehicle radar system having at least one transceiver arrangement arranged to generate and transmit radar signals, and to receive reflected radar signals, where the transmitted radar signals have been reflected by one or more objects. The transceiver arrangement) includes an ADC (Analog to Digital Converter) arrangement that is arranged to output a digital IF (Intermediate Frequency) signal in a time domain to a DSP (Digital Signal Processor) arrangement that is adapted for radar signal processing.

A first DSP function is arranged to:
identify and retain sample points of the digital IF signal in a spectral domain with signal components that exceed a certain level threshold, such that an approximation signal is formed in the time domain;
identify possible sections of the digital IF signal in the time domain that exhibit interference exceeding an interference threshold;
determine whether or not to replace such sections with equivalent sections of the approximation signal; and
if applicable, replace such sections with equivalent sections of the approximation signal.

This object is also achieved by a method for a radar system, where the method includes the steps of:
Generating and transmitting radar signals;
Receiving reflected radar signals, where the transmitted radar signals have been reflected by one or more objects;
Outputting a digital IF (Intermediate Frequency) signal in a time domain;
Identifying and retaining sample points of the digital IF signal in a spectral domain with signal components that exceed a certain level threshold, such that an approximation signal is formed in the time domain;
identifying possible sections of the digital IF signal in the time domain that exhibit interference exceeding an interference threshold;
determining whether or not to replace such sections with equivalent sections of the approximation signal; and
if applicable, replacing such sections with equivalent sections of the approximation signal.

According to an example embodiment, the first DSP function is arranged to set all other sample points to zero when the approximation signal is formed.

According to another example embodiment, the first DSP function includes an FFT (Fast Fourier Transform) module, a threshold module, an inverse FFT module, an approximation module and a detection and repair module.

The FFT module is arranged to transform the digital IF signal to the spectral domain.

The threshold module is arranged to identify and retain sample points with signal components that exceed a certain level threshold, while all other sample points are set to zero.

The inverse FFT module is arranged to transform a spectral repair signal output from the threshold module to the time domain.

The approximation module is arranged to output an approximation signal.

The detection and repair module is arranged to identify possible sections of the digital IF signal that exhibit interference exceeding an interference threshold, to determine whether or not to replace such sections with equivalent sections of the approximation signal, and, if applicable, to replace such sections with equivalent sections of the approximation signal.

Other embodiments are disclosed in the following description and appended drawings.

A number of advantages are obtained by the present disclosure. Mainly, a vehicle radar system is provided that is able to provide removal of interference such that the interference level after FFT processing is at a lower level than previously. This results in reduced range reduction of the radar system due to the overlap of signals. Further, the removal of interference reduces the potential for false targets being found at the target identification stage.

BRIEF DESCRIPTION OF THE DRAWINGS

The present disclosure will now be described more in detail with reference to the appended drawings, where.

DETAILED DESCRIPTION

Figure 1:
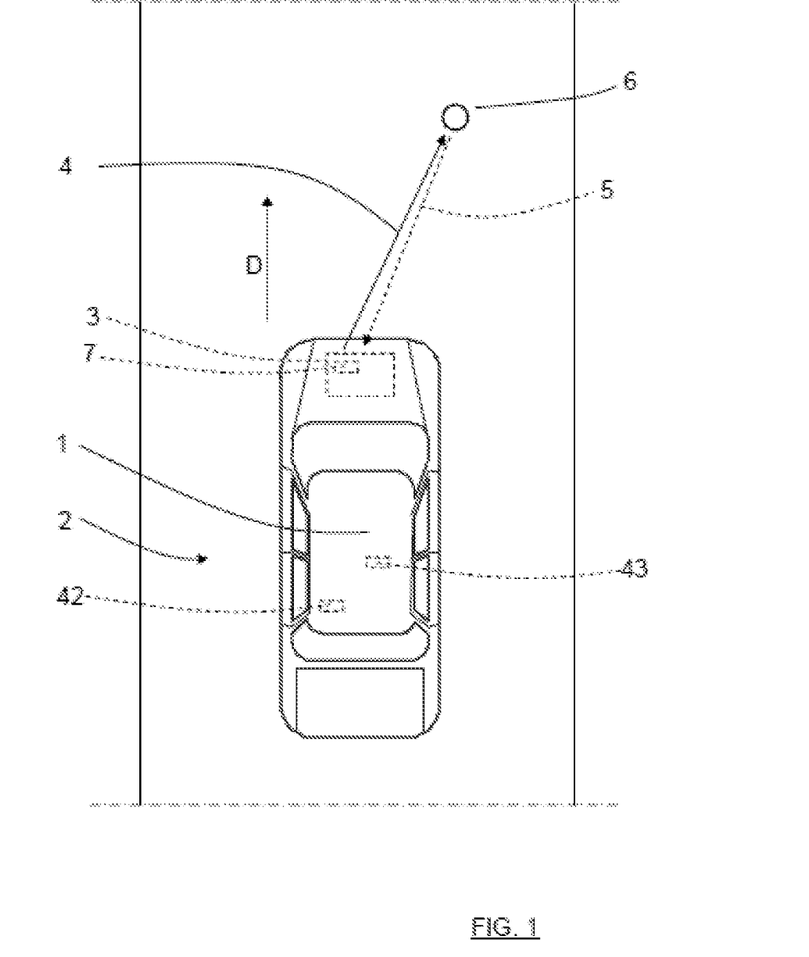
FIG. 1 shows a schematic top view of a vehicle.

FIG. 1 schematically shows a top view of a vehicle 1 arranged to run on a road 2 in a direction D, where the vehicle 1 includes a vehicle radar system 3 which is arranged to distinguish and/or resolve single targets from the surroundings by transmitting signals 4 and receiving reflected signals 5 and using a Doppler effect in a previously well-known manner.

The vehicle radar system 3 thus includes a radar transceiver arrangement 7 and is arranged to provide azimuth angle, radial velocity of possible target objects 6 by simultaneously sampling and analyzing phase and amplitude of the received signals 5. The distance to the target objects 6 is according to some aspect also acquired. The radar signals may for example be in the form of FMCW (Frequency Modulated Continuous Wave) Doppler signals operating at 77 GHz, so-called chirp signals.

Figure 2:
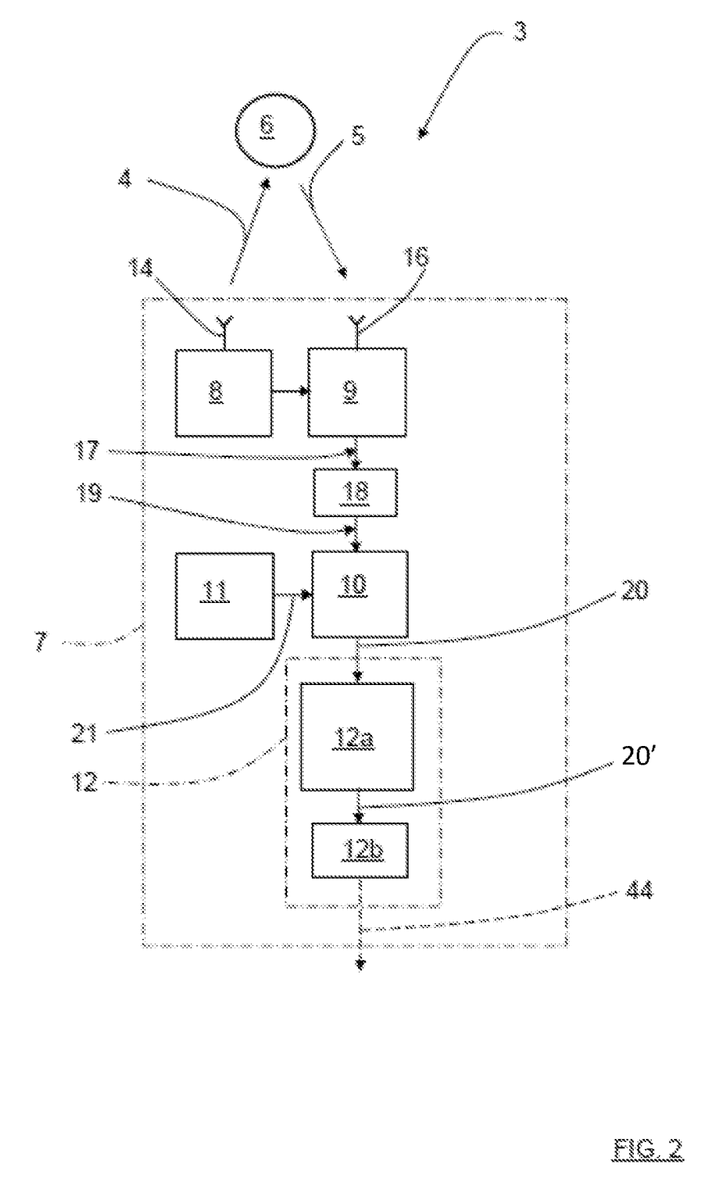
FIG. 2 shows a simplified schematic of a vehicle radar system.

With reference also to FIG. 2, the vehicle radar system 3 includes a transceiver arrangement 7 that is arranged for generating and transmitting sweep signals in the form of FMCW chirp signals 4, and to receive reflected signals 5, where the transmitted chirp signals 4 have been reflected by an object 6.

The transceiver arrangement 7 includes a transmitter 8 with a transmit antenna arrangement 14, a receiver 9 with a receiver antenna arrangement 16, an Analog to Digital Converter (ADC) arrangement 10 and sampling and timing arrangement 11.

Figure 3:
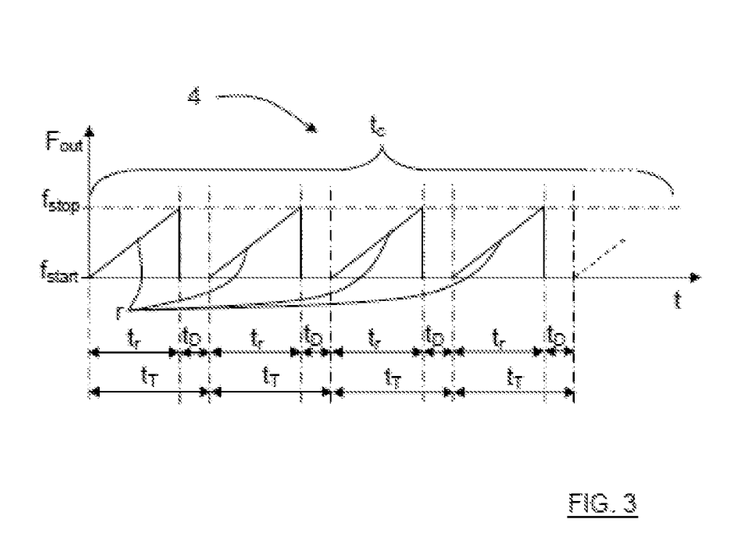
FIG. 3 shows an example of an FMCW chirp signal.

As shown in FIG. 3, a transmitted chirp signal 4 is in the form of a continuous sinusoid where the output frequency $F_{out}$ varies from a first frequency $f_{start}$ to a second frequency $f_{stop}$ over the course of a ramp r, where each chirp signal 4 includes repeating cycles of a plurality of frequency ramps r. There the magnitude of the first frequency $f_{start}$ falls below the magnitude of the second frequency $f_{stop}$.

A cycle for a chirp signal 4 lasts for a certain cycle time $t_c$, each ramp r lasts a certain ramp time $t_r$, having a ramp period time $t_T$. Between two consecutive ramps of the chirp signal 4 there is a delay time $t_D$.

Referring back to FIG. 2, the reflected signals 5 are received by the receiver 9 via the receiver antenna arrangement 16. The received signals 5, thus constituted by reflected radar echoes, are then mixed with the transmitted chirp signals 4 in the receiver 9. This may be a single channel mixer, or a two channel mixer having both in-phase and quadrature components. In this way, an IF (Intermediate Frequency) signal 17 is acquired, which may be real or, in the case of quadrature mixer, imaginary. The IF signal 17 is filtered in an IF filter 18 such that a filtered IF signal 19 is acquired.

The difference frequency of the filtered IF signal 19 relates to the target distance and is transferred to the corresponding ADC arrangement 10, where the filtered IF signal 19 is sampled at a certain predetermined sampling frequency $f_s$ and converted to a digital IF signal 20 having sample points in a previously known manner, the sampling frequency $f_s$ being provided in the form of a sampling and timing signal 21 produced by the sampling and timing arrangement 11 that is connected to the ADC arrangement 10.

The ADC arrangement 10 is connected to a DSP arrangement 12 that is adapted for radar signal processing in first DSP function 12a and a second DSP function 12b.

Figure 4:
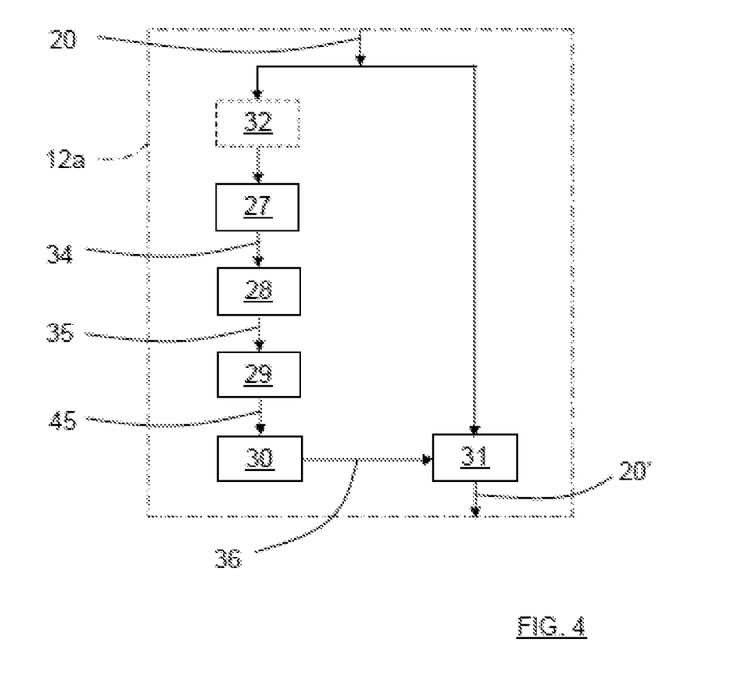
FIG. 4 shows a simplified schematic of a first DSP function that is arranged for interference removal.

According to the present disclosure, with reference also to FIG. 4, the first DSP function 12a is arranged for signal repair and includes an FFT (Fast Fourier Transform) module 27, a threshold module 28, an inverse FFT module 29, a buffer module 30 for storing the approximation signal and a detection and repair module 31. As indicated with dashed lines, the first DSP function 12a optionally includes a first optional pre-processing module 32. The optional pre-processing module 32 will be discussed more in the following description. The detection and repair module 31 is arranged to detect the samples that have incurred interference and this may be accomplished by using a high pass filter and threshold detection process.

The input digital IF signal 20 is transformed to a frequency domain by the FFT module 27, and the acquired digital spectral signal 34 is processed in the threshold module 28.

The threshold module 28 is arranged to identify and retain sample points with signal components that exceed a certain level threshold, while all other sample points are set to zero.

The threshold module 28 is arranged to output a spectral repair signal 35 that is fed into the inverse FFT module 29 that is arranged to transform the spectral repair signal 35 back to the time domain. A resulting output repair signal 45 is fed into the buffer module 30 that is arranged to output an approximation signal 36 that is fed into the detection and repair module 31. The buffer module 30 includes a storage buffer and is arranged to enable a necessary block, or necessary blocks, of the signal to be replaced in the detection and repair module 31.

The input digital IF signal 20 is also fed directly into the detection and repair module 31. The detection and repair module 31 is arranged to identify possible sections of the digital IF signal 20 that exhibit interference exceeding an interference threshold, and to determine whether or not to replace such sections with equivalent sections of the approximation signal 36 that is available from the buffer module 30.

The detection and repair module 31 is arranged to output a repaired digital IF signal 20' to the second DSP function 12b that is adapted for radar signal processing, for example by means of a windowing and range FFT function to convert the digital IF signal 20 to a range domain, and a Doppler FFT to combine the results from successive chirp signal ramps, or other suitable Doppler radar cycles, into the Doppler domain. This results in an output 44 having Range-Doppler matrices that are transferred for further processing, which is not further discussed here, many examples of such further processing being well-known in the art.

The second DSP function 12b is well-known and its functionality is well-known in the art and is therefore described in less detail than the first DSP function 12a. The first DSP function 12a and the second DSP function 12b may very well be practically implemented in one and the same signal processor arrangement in the DSP arrangement 12, or, alternatively, in different signal processor arrangements in the DSP arrangement 12.

More in detail, the digital spectral signal 34 is constituted by a complex vector that represents the targets at amplitude peaks, where each amplitude peak position corresponds to the frequency (or range). Without interference, the amplitude level of the digital spectral signal 34 between the amplitude peaks will be low, corresponding to a noise floor. However, when bursts of interference occur in the time domain, the noise floor rises up, thus hiding the weaker targets that were detectable previously. The larger targets, still having amplitude that exceeds the amplitude of the noise floor, are still detectable.

The complex vector of the digital spectral signal 34 is used to identify the largest targets, i.e. the signal components that have an amplitude level that exceeds the certain level threshold. All parts between these signal components are set to zero, mainly containing noise.

Then, after the inverse FFT, the acquired output repair signal 45 only contains information of the largest targets, and thus lacks information about the smaller targets. Therefore, the detection and repair module 31 is arranged to keep as much of the original digital IF signal 20 as possible, since it contain the signal from the smaller targets as well. But where the digital IF signal 20 is determined to contain interference, this section of the digital IF signal 20 is deleted and the equivalent signal section from the approximation signal 36 is inserted instead to form the repaired digital IF signal 20'. There may be an additional smoothing within the detection and repair module 31 that is arranged to remove any discontinuities in sections of the signal bordering the transition from original signal to replaced signal but this is not essential.

Figure 5:
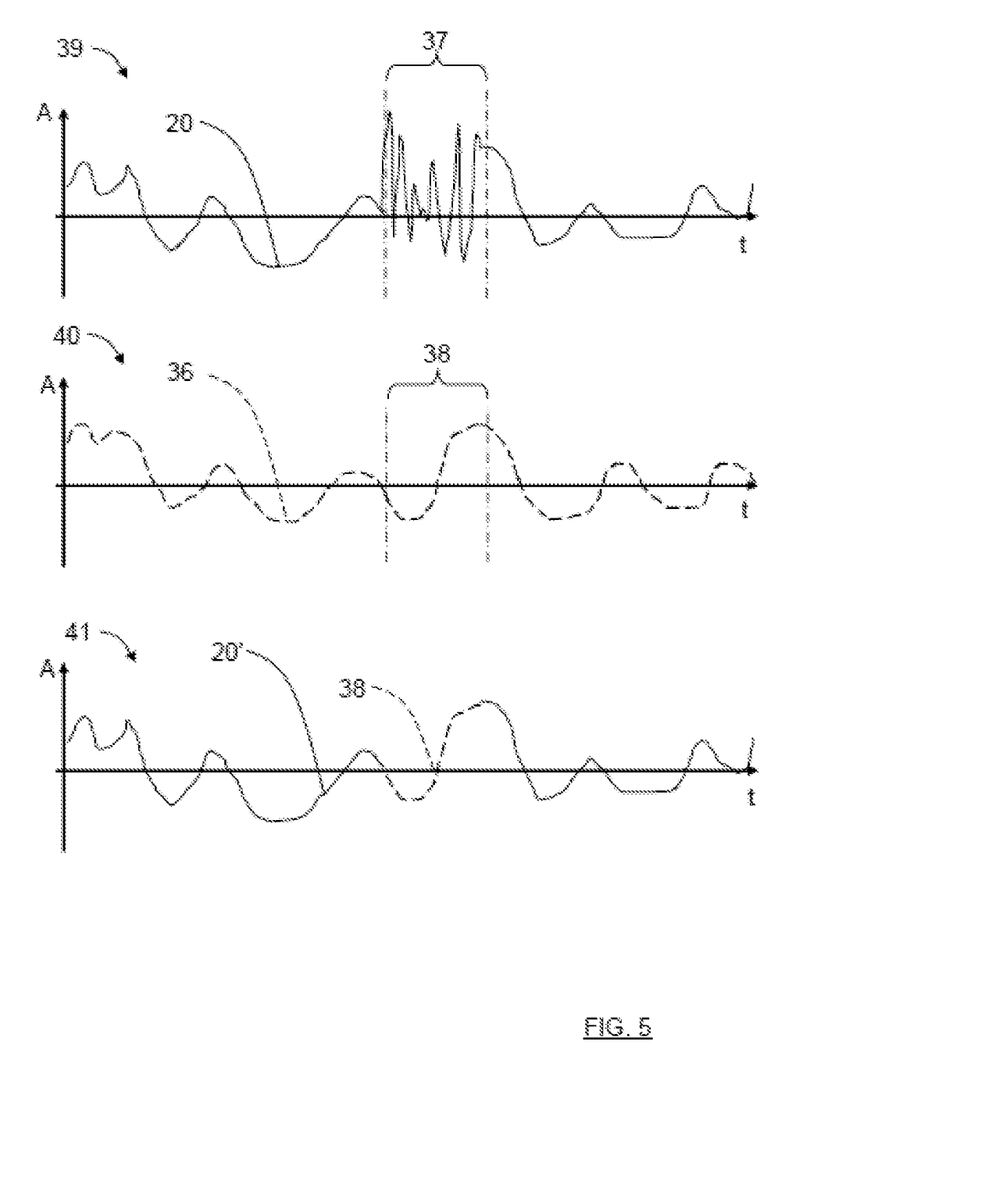
FIG. 5 shows three graphs of digital IF signals.

This means that when the processing starts at the second DSP function 12b, most targets are present in the repaired digital IF signal 20'. Only in those sections that are determined to contain interference, there is only information about the larger targets, so the energy/information about the smaller targets is slightly reduced, but they end up being much more present than when the noise burst is left in the original digital IF signal 20, without repair. As mentioned previously, those sections of the digital IF signal 20 that are determined to contain interference are those that are determined to exhibit interference exceeding an interference threshold, This is illustrated in FIG. 5, where three graphs 39, 40, 41 are shown, all graphs 39, 40, 41 showing amplitude A on their y-axis and time t on their x-axis. A first graph 39 shows the original digital IF signal 20 with a period of interference 37. A second graph 40 shows the approximation signal 36, and a third graph 41 shows the repaired digital IF signal 20' where the period of interference 37 from the first graph has been removed and the equivalent signal section 38 from the approximation signal 36 has been inserted instead.

The repaired digital IF signal 20' thus includes the original digital IF signal 20 without the deleted portions, and the equivalent portions of the approximation signal 36 are inserted instead of the deleted portions. Only one such deleted portion 37 is shown in the example with reference to FIG. 5, but in practice each radar cycle may include one or more such portions that may have originated from one or more external interference sources.

As indicated in FIG. 1, the vehicle 1 includes a safety control unit 42 and safety system 43, for example an emergency braking system and/or an alarm signal device. The safety control unit 42 is arranged to control the safety system 43 in dependence of input from the radar system 3. According to an aspect, the output 44 of the second DSP function 12b constitutes input to the safety control unit 42.

Figure 6:
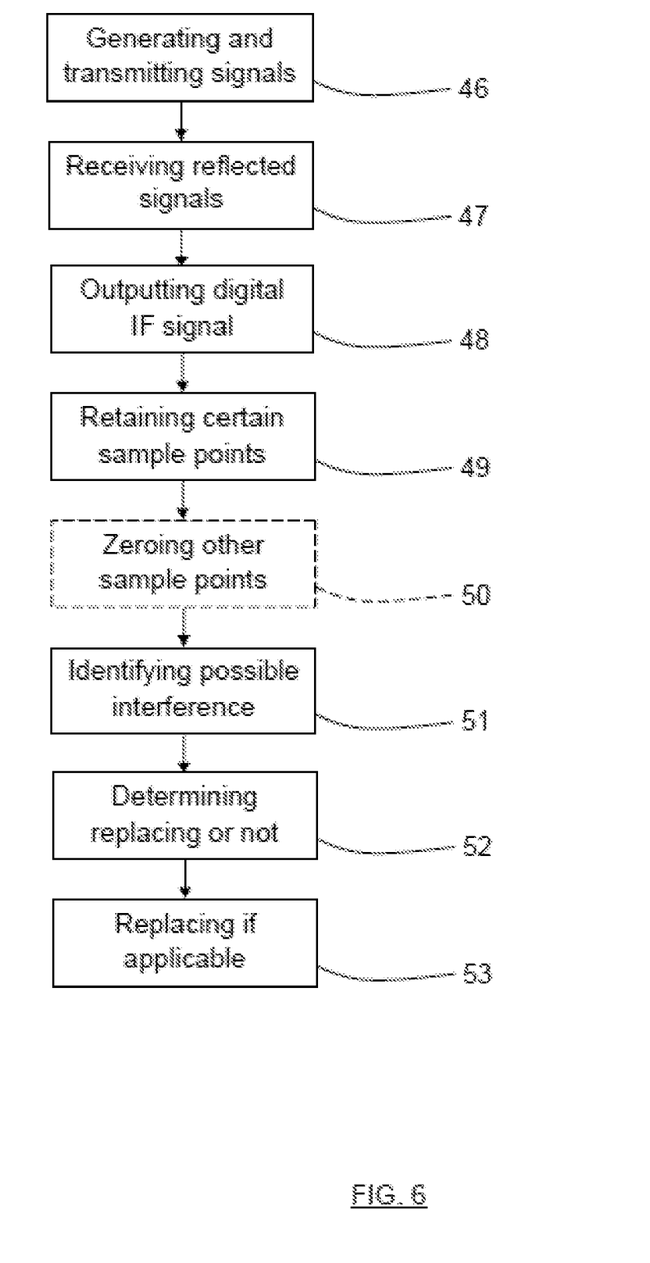
FIG. 6 shows a flowchart for methods according to the present disclosure.

According to FIG. 6, the present disclosure relates to a method having:

Step 46: Generating and transmitting radar signals 4.

Step 47: Receiving reflected radar signals 5, where the transmitted radar signals 4 have been reflected by one or more objects 6.

Step 48: Outputting a digital IF signal 20 in a time domain.

Step 49: Identifying and retaining sample points of the digital IF signal 20 in a spectral domain with signal components that exceed a certain level threshold such that an approximation signal 36 is formed in the time domain.

Step 51: Identifying possible sections 37 of the digital IF signal 20 in the time domain that exhibit interference exceeding an interference threshold.

Step 52: Determining whether or not to replace such sections 37 with equivalent sections 38 of the approximation signal 36.

Step 53: If applicable, replacing such sections 37 with equivalent sections 38 of the approximation signal 36.

According to an example, the method further includes:

Step 50: Setting all other sample points to zero when forming the approximation signal 36.

For the above method, the digital IF signal 20 in the time domain is processed in a parallel manner; one part is processed such that the approximation signal 36 is formed in the time domain, and one part is examined for possible interference sections, where parts of the approximation signal 36 is used to replace such interference sections where applicable. The result is a repaired digital IF signal 20'.

The present disclosure is not limited to the examples above, but may vary freely within the scope of the appended claims. For example, the radar system may be implemented in any type of vehicle such as cars, trucks, buses, boats and aircraft as well as fixed radars such as those monitoring traffic flow, marine environments, aircraft landing or presence of pedestrians.

The radar transceiver 7 is adapted for any suitable type of Doppler radar. There may be any number of radar transceivers 7 in the vehicle radar system 3, and they may be arranged for transmission and signals in any suitable direction. The plurality of sensing sectors or sensing bins may thus be directed in other desirable directions, such as rearwards or at the sides of the vehicle 1.

If the digital IF signal 20 is determined to not contain any interference and/or it is determined to not replace sections of the digital IF signal 20 with the approximation signal 36, the repaired digital IF signal 20' is identical to the digital IF signal 20. The term "repaired" does in this context not indicate that an actual reparation has occurred, but that a reparation has been possible.

The FFT module 27 and the inverse FFT module 29 may be combined in one and the same FFT calculation module. According to some aspects, the inverse FFT module 29 is arranged for a discrete inverse FFT that only provides the necessary signal estimation sample points as instructed by the detection and repair module 31, thus avoiding the need for a full inverse FFT. The range FFT and Doppler FFT described may be performed in any suitable FFT calculation module.

The ADC arrangement 10 and DSP arrangement 12 should be interpreted as having a corresponding ADC and DSP functionality, and may each be constituted by a plurality of separate components. Alternatively, each ADC arrangement may be provided in one ADC chip, and each DSP arrangement may be included in one DSP chip, or even combined in one common chip.

According to an aspect, each antenna arrangement 14, 16 includes one or more antennas, where each antenna may be constituted by one antenna element or by an array of antenna elements. The number of antenna arrangements, antennas within each antenna arrangement, IF signals and corresponding receiver (RX) channels may vary.

According to an aspect, this means that if a radar system 3 such as the one described above includes a plurality of simultaneous parallel receiver (RX) channels, these enable estimation of target azimuth angle. In such cases, it is possible to analyze the signal of only one RX channel in order to identify which ADC samples that have suffered the interference.

Since the other RX channels are sampled simultaneously, the same ADC block of ADC samples during a radar cycle will suffer interference. This can be used to simplify the processing.

The FFT module 27, which is arranged for transforming the digital IF signal 20 to the frequency domain, is according to some aspects also able to operate more efficiently when analyzing multiple RX channels in parallel, since the signal on each channel would typically include targets of similar ranges. The important differences between the RX channels would be the amplitude and phase of the signal at certain ranges. Therefore having performed a full FFT on a first channel, and the peak search in the threshold module 28, it may be possible to perform a discrete Fourier Transform at only the spectral frequencies identified from the first channel for all subsequent channels.

If the ADC signal is real, according to some aspect, the inverse FFT module 29 is arranged for an inverse discrete cosine transform. This is particularly appealing if the number of samples suffering interference is small compared to the total length of the ADC samples of a radar cycle.

According to an aspect, the optional pre-processing module 32 is arranged to reduce the noise floor in a first stage. This could be performed by multiplying the signal by $2^N$ and discarding the overflow bits, such that the interference would appear clipped but the original signal is unchanged. Alternatively, the replacement module 31 could be arranged to replace the interference samples with value 0. The pre-processing module 32 has the benefit of lowering the noise floor slightly at the digital spectral signal 34 such that the threshold applied at the threshold module 28 could be lower, and the approximation signal 36 could include weaker targets.

According to some aspects, when forming the approximation signal 36, it is not necessary to set all other sample points to zero when sample points of the digital IF signal 20 in a spectral domain with signal components that exceed a certain level threshold have been identified and retained. This is due to that since the interference zones are identified, they do not need to set to be zero.

The vehicle radar system 3 according to the above is thus arranged to operate in the presence of external interference sources using a certain signal repair procedure in accordance with the present disclosure. The signal repair procedure includes detecting the sections of the ADC signal that have incurred the interference, and replacing just those sections with an approximation signal, maintaining small target information with minimal side-lobe creation. The approximation signal is derived using an FFT process on the original signal and removing interference manually by a thresholding technique.

Generally, the present disclosure relates to a vehicle radar system 3 having at least one transceiver arrangement 7 arranged to generate and transmit radar signals 4, and to receive reflected radar signals 5, where the transmitted radar signals 4 have been reflected by one or more objects 6, where the transceiver arrangement 7 includes an ADC (Analog to Digital Converter) arrangement 10 that is arranged to output a digital IF (Intermediate Frequency) signal 20 in a time domain to a DSP (Digital Signal Processor) arrangement 12 that is adapted for radar signal processing. A first DSP function 12a is arranged to:

identify Identify and retain sample points of the digital IF signal 20 in a spectral domain with signal components that exceed a certain level threshold, such that an approximation signal 36 is formed in the time domain;

identify possible sections 37 of the digital IF signal 20 in the time domain that exhibit interference exceeding an interference threshold;

determine whether or not to replace such sections 37 with equivalent sections 38 of the approximation signal 36; and if applicable, replace such sections 37 with equivalent sections 38 of the approximation signal 36.

According to an example, the first DSP function 12a is arranged to set all other sample points to zero when the approximation signal 36 is formed.

According to an example, the first DSP function 12a includes an FFT (Fast Fourier Transform) module 27, a threshold module 28, an inverse FFT module 29, an approximation module 30 and a detection and repair module 31, where:

the FFT module 27 is arranged to transform the digital IF signal 20 from the time domain to the spectral domain;

the threshold module 28 is arranged to identify and retain sample points with signal components that exceed a certain level threshold, while all other sample points are set to zero;

the inverse FFT module 29 is arranged to transform a spectral repair signal 35 output from the threshold module 28 to the time domain;

the approximation module 30 is arranged to output an approximation signal 36; and the detection and repair module 31 is arranged to identify possible sections 37 of the digital IF signal 20 in the time domain that exhibit interference exceeding an interference threshold, to determine whether or not to replace such sections 37 with equivalent sections 38 of the approximation signal 36, and, if applicable, to replace such sections 37 with equivalent sections 38 of the approximation signal 36.

According to an example, the detection and repair module 31 is arranged to output a repaired digital IF signal 20' to a second DSP function 12b that is adapted for radar signal processing by use of a range FFT to convert the repaired digital IF signal 20' to a range domain, and a Doppler FFT to combine the results from successive Doppler radar cycles into the Doppler domain.

According to an example, the radar system 3 includes a plurality of simultaneous parallel receiver channels, where the radar system 3 is arranged to identify possible sections 37 of the digital IF signal 20 in the time domain that exhibit interference exceeding an interference threshold for only one receiver channel.

Generally, the present disclosure also relates to a method for a radar system 3, where the method includes the steps:

Step 46: generating and transmitting radar signals 4;

Step 47: receiving reflected radar signals 5, where the transmitted radar signals 4 have been reflected by one or more objects 6;

Step 48: outputting a digital IF (Intermediate Frequency) signal 20 in a time domain;

Step 49: identifying and retaining sample points of the digital IF signal 20 in a spectral domain with signal components that exceed a certain level threshold, such that an approximation signal 36 is formed in the time domain;

Step 51: identifying possible sections 37 of the digital IF signal 20 in the time domain that exhibit interference exceeding an interference threshold;

Step 52: determining whether or not to replace such sections 37 with equivalent sections 38 of the approximation signal 36; and Step 53: if applicable, replacing such sections 37 with equivalent sections 38 of the approximation signal 36.

According to an example, the method further includes:

Step 50: setting all other sample points to zero when forming the approximation signal 36.

According to an example, the method further includes outputting a repaired digital IF signal 20' for radar signal processing by converting the repaired digital IF signal 20' to a range domain, and combining the results from successive Doppler radar cycles into the Doppler domain.

According to an example, the method includes identifying possible sections 37 of the digital IF signal 20 in the time domain that exhibit interference exceeding an interference threshold for only one receiver channel where the radar system 3 uses a plurality of simultaneous parallel receiver channels.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising, at least one transceiver arrangement arranged to generate and transmit radar signals, and to receive reflected radar signals, where the transmitted radar signals have been reflected by one or more objects, where the transceiver arrangement comprises an ADC, Analogue to Digital Converter, that is arranged to output a digital IF, Intermediate Frequency signal in a time domain to a DSP, Digital Signal Processor, that is adapted for radar signal processing, the digital signal processor arranged by providing a first DSP function including:

transform the digital IF signal from the time domain to a spectral domain;

identify and retain sample points of the digital IF signal in the spectral domain with signal components that exceed a certain level threshold to form a spectral repair signal;

transform the spectral repair signal from the spectral domain to the time domain to form an output repair signal;

form an approximation signal domain based on the output repair signal;

identify possible sections of the digital IF signal in the time domain that exhibit interference exceeding an interference threshold; and replace the possible sections with equivalent sections of the approximation signal.

2. The vehicle radar system according to claim 1, further comprising, that the first DSP function is arranged to set all other sample points to zero when the approximation signal is formed.

3. The vehicle radar system according to claim 2, wherein the first DSP function comprises an FFT, Fast Fourier Transform module, a threshold module, an inverse FFT module, an approximation module and a detection and repair module, wherein:

the FFT module is arranged to transform the digital IF signal from the time domain to the spectral domain;

the threshold module is arranged to identify and retain sample points with signal components that exceed a certain level threshold, while all other sample points are set to zero;

the inverse FFT module is arranged to transform a spectral repair signal output from the threshold module to the time domain;

the approximation module is arranged to output an approximation signal; and the detection and repair module is arranged to identify the possible sections of the digital IF signal in the time domain that exhibit interference exceeding an interference threshold, to determine whether or not to replace the possible sections with the equivalent sections of the approximation signal, and, if applicable, to replace the possible sections with the equivalent sections of the approximation signal.

4. The vehicle radar system according to claim 3, further comprising, the detection and repair module is arranged to output a repaired digital IF signal to a second DSP function that is adapted for radar signal processing by use of a range FFT to convert the repaired digital IF signal to a range domain, and a Doppler FFT to combine the results from successive Doppler radar cycles into the Doppler domain.

5. The vehicle radar system according to claim 1, wherein the radar system further comprises, a plurality of simultaneous parallel receiver channels, where the radar system is arranged to identify possible sections of the digital IF signal in the time domain that exhibit interference exceeding the interference threshold for only one receiver channel.

6. A method for a radar system, where the method comprises the steps of:

generating and transmitting radar signals;

receiving reflected radar signals, where the transmitted radar signals have been reflected by one or more objects; and outputting a digital IF signal in a time domain;

transforming the digital IF signal from the time domain to a spectral domain;

identifying and retaining sample points of the digital IF signal in the spectral domain with signal components that exceed a certain level threshold to form a spectral repair signal;

transforming the spectral repair signal from the spectral domain to the time domain to form an output repair signal;

forming an approximation signal based on the output repair signal;

identifying possible sections of the digital IF signal in the time domain that exhibit interference exceeding an interference threshold; and replacing the possible sections with equivalent sections of the approximation signal.

7. A method according to claim 6, wherein the method further comprises setting all other sample points to zero when forming the approximation signal.

8. The method according to claim 6, wherein the method further comprises, outputting a repaired digital IF signal for radar signal processing by converting the repaired digital IF signal to a range domain, and combining the results from successive Doppler radar cycles into the Doppler domain.

9. The method according to claim 6, wherein the method further comprises, identifying possible sections of the digital IF signal in the time domain that exhibit interference exceeding an interference threshold for only one receiver channel where the radar system uses a plurality of simultaneous parallel receiver channels.

10. A vehicle radar system comprising, at least one transceiver arrangement arranged to generate and transmit radar signals, and to receive reflected radar signals, where the transmitted radar signals have been reflected by one or more objects, where the transceiver arrangement comprises an ADC, Analogue to Digital Converter, that is arranged to output a digital IF, Intermediate Frequency signal in a time domain to a DSP, Digital Signal Processor, that is adapted for radar signal processing, the digital signal processor arranged by providing a first DSP function including:

identify and retain sample points of the digital IF signal in a spectral domain with signal components that exceed a certain level threshold, such that an approximation signal is formed in the time domain;

identify possible sections of the digital IF signal in the time domain that exhibit interference exceeding an interference threshold; and replace the possible sections with equivalent sections of the approximation signal;

wherein the first DSP function is arranged to set all other sample points to zero when the approximation signal is formed; and wherein the first DSP function comprises an FFT, Fast Fourier Transform module, a threshold module, an inverse FFT module, an approximation module and a detection and repair module, wherein:

the FFT module is arranged to transform the digital IF signal from the time domain to the spectral domain;

the threshold module is arranged to identify and retain sample points with signal components that exceed a certain level threshold, while all other sample points are set to zero;

the inverse FFT module is arranged to transform a spectral repair signal output from the threshold module to the time domain;

the approximation module is arranged to output an approximation signal; and the detection and repair module is arranged to identify the possible sections of the digital IF signal in the time domain that exhibit interference exceeding an interference threshold, to determine whether or not to replace the possible sections with the equivalent sections of the approximation signal, and, if applicable, to replace the possible sections with the equivalent sections of the approximation signal.

11. The vehicle radar system according to claim 10, further comprising, the detection and repair module is arranged to output a repaired digital IF signal to a second DSP function that is adapted for radar signal processing by use of a range FFT to convert the repaired digital IF signal to a range domain, and a Doppler FFT to combine the results from successive Doppler radar cycles into the Doppler domain.

\* \* \* \* \*